US008351423B2

(12) United States Patent
Leppisaari et al.

(10) Patent No.: US 8,351,423 B2
(45) **Date of Patent: *Jan. 8, 2013**

(54) PAGE-MODE MESSAGING

(75) Inventors: Arto Leppisaari, Kangasala (FI); Jari Mutikainen, Lepsämä (FI); Pekka Kuure, Espoo (FI); Adamu Haruna, Accra North (GH)

(73) Assignee: Nokia Corporation, Espoo (FI)

( * ) Notice: Subject to any disclaimer, the term of this patent is extended or adjusted under 35 U.S.C. 154(b) by 167 days.

This patent is subject to a terminal disclaimer.

(21) Appl. No.: 12/900,616

(22) Filed: Oct. 8, 2010

(65) Prior Publication Data

US 2011/0110365 A1 May 12, 2011

Related U.S. Application Data

(63) Continuation of application No. 11/206,806, filed on Aug. 19, 2005, now Pat. No. 7,835,345.

(30) Foreign Application Priority Data

Jun. 6, 2005 (FI) ...................................... 20055288

(51) Int. Cl.
*H04L 12/66* (2006.01)

(52) U.S. Cl. ........................................ 370/352; 370/259

(58) Field of Classification Search .................. 370/352, 370/259
See application file for complete search history.

(56) References Cited

U.S. PATENT DOCUMENTS

| | | | |
|---|---|---|---|
| 5,463,672 | A | 10/1995 | Kage |
| 7,260,601 | B1 | 8/2007 | Day et al. |
| 2003/0050051 | A1 | 3/2003 | Vilander |
| 2004/0203894 | A1 | 10/2004 | Watanabe et al. |
| 2005/0007971 | A1 | 1/2005 | Jeong et al. |
| 2005/0233737 | A1 | 10/2005 | Lin |
| 2006/0069986 | A1 | 3/2006 | Sandoval |
| 2006/0089966 | A1 | 4/2006 | Stille et al. |
| 2007/0218924 | A1 | 9/2007 | Burman et al. |

FOREIGN PATENT DOCUMENTS

| | | | |
|---|---|---|---|
| CN | 1555659 | A | 12/2004 |
| TW | I223530 | | 11/2004 |
| TW | I225740 | | 12/2004 |
| WO | 03009616 | A1 | 1/2003 |
| WO | 2005055556 | A1 | 6/2005 |

OTHER PUBLICATIONS

Chinese Office Action application No. 200680025858.7 dated Oct. 25, 2011.

Japanese Office Action, Japanese Patent Application No. 2008-515237, Draft of Date: Sep. 21, 2010, pp. 1-2, English Translation: 1 page.

(Continued)

*Primary Examiner* — Quynh Nguyen

(74) *Attorney, Agent, or Firm* — Squire Sanders (US) LLP

(57) ABSTRACT

A method, apparatus, and computer program product are provided for page-mode messaging. The method includes determining whether a page-mode message exceeds a predetermined size limit. The method further includes sending, using a terminal, the page-mode message using a session-mode messaging mechanism when it is determined that the page-mode message exceeds the predetermined size limit, with an indication indicating that a session-mode is for the page-mode message. Further, the method includes applying, using the terminal, a session description protocol to initiate a session in the session-mode messaging mechanism, and adding, using the terminal, the indication to a header of a session initiation message.

38 Claims, 6 Drawing Sheets

OTHER PUBLICATIONS

Chinese Office Action application No. 200680025858.7 dated Apr. 25, 2011.
Chinese Office Action application No. 200680025858.7 dated Apr. 19, 2012.
Israeli Office Action application No. 187751 dated Aug. 8, 2011.
Canadian Office Action application No. 2,686,955 dated Jul. 12, 2011.
Canadian Office Action application No. 2,609,958 dated Aug. 30, 2011.
J. Rosenberg et al., Network Working Group, Request for Comments: 3261, "SIP: Session Initiation Protocol," Jun. 2002, pp. 1-269.
B. Campbell et al., Network Working Group, Request for Comments: 3428, "Session Initiation Protocol (SIP) Extension for Instant Messaging," Dec. 2002, pp. 1-18.
B. Campbell et al., Simple Working Group, Internet-Draft, "Instant Message Sessions in Simple draft-ietf-simple-message-sessions-00," <tools.ietf.org.pdf/draft-ietf-simple-message-sessions-00.pdf>, May 22, 2003, Expires: Nov. 20, 2003, pp. 1-47.
Kutscher et al., "Session Description and Capability Negotiation," XP015023241, Feb. 20, 2005, pp. 1-61.
B. Campbell et al., "The Message Session Replay Protocol," <draft-ietf-simple-message-sessions-10.txt>, Simple WG, Internet-Draft, Feb. 20, 2005, Expires: Aug. 24, 2005, pp. 1-53.
Simone Leggio (Department of Computer Science, University of Helsinki), "SIP for Instant Messaging and Presence Leveraging Extensions," Mar. 18, 2005, pp. 1-7.
PCT International Search Report, International Application No. PCT/IB2007/052808, Date of Completion: Dec. 4, 2007, Date of Mailing: Dec. 14, 2007, pp. 1-3.
Russian Office Action, Russian Patent Application No. 2007144490/09(048746), Date: Sep. 4, 2009, pp. 1-6, English Translation: pp. 1-5.
Notification of the First Office Action, Chinese Application No. 200680025858.7, Date of Notification: May 11, 2010, pp. 1-6.
Canadian Office Action, Canadian Patent Application No. 2,609,958; Date: Jul. 12, 2010, pp. 1-3.
Indonesian Office Action application No. WO0200703925 dated Feb. 17, 2011.
Malaysian Office Action application No. PI 20062355 dated Feb. 14, 2011.
Japanese Office Action dated Jun. 4, 2012 corresponding to Japanese Patent Application No. 2010-285397 and English translation thereof.
Official Letter and Search Report issued Sep. 27, 2012 corresponding to Taiwanese Patent Application No. 095119321 and English translation thereof.

```
INVITE sip:bob@otherexample.com SIP/2.0
To: <sip:bob@otherexample.com>
From: <sip:alice@example.com>;tag=786
Call-ID: 3413an89KU
Content-Type: application/sdp

v=0
o=alice 2890844526 2890844527 IN IP4 alice.example.com
s=-
c=IN IP4 10.1.1.1
m=message 9 msrp page-mode                          (5-1)
a=accept-types:message/cpim text/plain
a=path:msrp://atlanta.example.com:7654/jshA7we;tcp
a=max-size: actual size                             (5-2)
```

*FIG.5A*

```
INVITE sip:bob@otherexample.com SIP/2.0
To: <sip:bob@otherexample.com>
From: <sip:alice@example.com>;tag=786
Call-ID: 3413an89KU
Content-Type: application/sdp

v=0
o=alice 2890844526 2890844527 IN IP4 alice.example.com
s=-
c=IN IP4 10.1.1.1
m=message 9 msrp page-mode                          (5-1)
a=accept-types:message/cpim text/plain
a=path:msrp://atlanta.example.com:7654/jshA7we;tcp
a=max-size: max size
a=actual-size: actual size                          (5-3)
```

*FIG.5B*

```
INVITE sip:bob@otherexample.com SIP/2.0
To: <sip:bob@otherexample.com>
From: <sip:alice@example.com>;tag=786
Call-ID: 3413an89KU
Content-Type: application/sdp

v=0
o=alice 2890844526 2890844527 IN IP4 alice.example.com
s=-
c=IN IP4 10.1.1.1
m=message 9 msrp
a=accept-types:message/cpim text/plain
a=path:msrp://atlanta.example.com:7654/jshA7we;tcp
a=max-size: max size
a=actual-size: actual size
```

```
INVITE sip:bob@otherexample.com SIP/2.0
To: <sip:bob@otherexample.com>
From: <sip:alice@example.com>;tag=786
Call-ID: 3413an89KU
Content-Type: application/sdp

v=0
o=alice 2890844526 2890844527 IN IP4 alice.example.com
s=-
c=IN IP4 10.1.1.1
m=message 9 msrp page-mode
a=accept-types:message/cpim text/plain
a=path:msrp://atlanta.example.com:7654/jshA7we;tcp
a=max-size: max size
```

PAGE-MODE MESSAGING

CROSS REFERENCE TO RELATED APPLICATIONS

This is a continuation application of U.S. patent application Ser. No. 11/206,806, filed on Aug. 19, 2005, which claims priority of Finnish Patent Application No. 20055288, filed on Jun. 6, 2005. The subject matter of the earlier filed applications is hereby incorporated by reference.

BACKGROUND

1. Field

The invention relates to messaging, and more particularly to page-mode messaging, also called one-shot messaging.

2. Description of the Related Art

The evolvement of communication technology, particularly IP-based communication technology and end user terminals, has enabled versatile communication possibilities and introduction of different services. More and more often services are implemented using primitives provided by SIP (Session Initiation Protocol) which is not vertically integrated into a communications system but a tool to build a multimedia architecture. More precisely, SIP is an IETF defined application-layer control (signaling) protocol for creating, modifying, and terminating sessions with one or more participants. These sessions include Internet telephone calls, multimedia distribution, multimedia conferences, and PoC (Push to talk over Cellular) sessions, for example. For messaging services, SIMPLE (SIP for Instant Messaging and Presence Leveraging Extensions) using SIP and existing implementations of SIP to provide presence and instant messaging service is being defined in IETF OMA (Open Mobile Alliance) also defines IM (Instant Messaging) enabler based on SIP/SIMPLE protocols. SIMPLE defines two modes of instant message exchange: page-mode and session-mode. The page-mode uses SIP MESSAGE method by which a page-mode instant message is sent and where, at a protocol level, a subsequent instant message is not related to the preceding one: each immediate message, even a reply to a previous message, is considered as an independent transaction. Thus, the SIP MESSAGE method resembles a conventional email or short message service. The session-mode uses SIP for signaling and session establishment and MSRP (Message Session Relay Protocol) for carrying a series of instant messages after a session has been established. Below, the combination is simply called an MSRP mechanism. In other words, an MSRP mechanism provides chat-type messaging, called session-mode messaging.

A problem arises when a user wants to send a large page-mode message. The SIP MESSAGE method may use either UDP or TCP transport. TCP provides a reliable transport method also for large messages, but TCP transport cannot always be guaranteed for the SIP MESSAGE method. If UDP is used for sending a large message, packets larger than UDP maximum size are fragmented and may not arrive in the right order at the recipient. In addition, even if TCP could be guaranteed, another problem relating to congestion control remains. Since the SIP MESSAGE method is part of SIP session control signaling, a message is sent and received using the very same resource as used by the SIP signaling. For a user terminal this means that the actual SIP signaling may be blocked for the time the large message is being sent or received in the user terminal. The above-mentioned resource for the SIP signaling may be a general-purpose PDP (Packet Data Protocol) context or a dedicated signaling PDP context in case of the GERAN (GSM/EDGE Radio Access Network) and/or UTRAN (UMTS Terrestrial Radio Access Network) systems, for example. In other systems, the resource may be a reserved and/or dedicated bandwidth for signaling purposes, for example. In addition to the SIP signaling being blocked, a further problem relating to loading of SIP proxies may arise. As a page-mode message conventionally uses the SIP MESSAGE method, all messages using the SIP MESSAGE method are transmitted through the SIP proxies. Thus, the large size page-mode messages transmitted through the SIP proxies may cause a severe decrease in the performance of the SIP proxies, resulting in both effectively blocking all SIP signaling and decreasing the overall performance of the SIP network. Therefore, in some cases, the SIP MESSAGE method is not feasible to be used for a large size message.

One solution is that when the message size exceeds a certain limit, instead of the SIP MESSAGE method the MSRP mechanism is used. However, the MSRP mechanism is for a session-mode messaging service, not for page-mode messaging. Additionally, received page-mode messages can be deferred and are stored into a messaging inbox, wherefrom the user can read them when it is convenient, but in the session-mode messaging a received message is opened by the user terminal and shown to the user to facilitate a dialog. Thus, from the receiver's point of view, no page-mode messages can be received when the MSRP mechanism is used.

SUMMARY

In accordance with an embodiment of the invention, there is provided a method, which includes determining whether a page-mode message exceeds a predetermined size limit, and sending, using a terminal, the page-mode message using a session-mode messaging mechanism when it is determined that the page-mode message exceeds the predetermined size limit, with an indication indicating that a session-mode is for the page-mode message. The method further includes applying, using the terminal, a session description protocol to initiate a session in the session-mode messaging mechanism, and adding, using the terminal, the indication to a header of a session initiation message.

In accordance with another embodiment of the invention, there is provided an apparatus, which includes at least one processor, and memory including computer program code. The memory and the computer program code are configured to, with the at least one processor, cause the apparatus at least to determine whether a page-mode message exceeds a predetermined size limit, and send a message using a session-mode messaging mechanism, when it is determined that the page-mode message exceeds the predetermined size limit, with an indication indicating that the message is a page-mode message. The memory and the computer program code are also configured to, with the at least one processor, cause the apparatus at least to apply a session description protocol to initiate a session in the session-mode messaging mechanism, and add the indication to a header of a session initiation message.

In accordance with another embodiment of the invention, there is provided an apparatus, which includes at least one processor, and memory including computer program code. The memory and the computer program code are configured to, with the at least one processor, cause the apparatus at least to detect an indication in a header of a session initiation message that a session-mode messaging mechanism is used for a page-mode message, and in response to the indication, treat a received session-mode message as the page-mode message. The memory and the computer program code are also configured to, with the at least one processor, cause the apparatus at least to notify a user of the received page-mode message. The page-mode message is received as the session-mode message with the indication in response to the page-mode message exceeding a predetermined size limit.

In accordance with another embodiment of the invention, there is provided a server apparatus, which includes at least one processor, and memory including computer program code. The memory and the computer program code are configured to, with the at least one processor, cause the apparatus at least to detect an indication in a header of a session initiation message that a session-mode messaging mechanism is used for a page-mode message, and in response to the indication, assume itself to be an end-point of the session-mode messaging mechanism. The memory and the computer program code are also configured to, with the at least one processor, cause the apparatus at least to, in response to the indication, define a message received via the session-mode messaging mechanism as the page-mode message, and notify a user of the received page-mode message. The page-mode message is received as the session-mode message with the indication in response to a page-mode message exceeding a predetermined size limit.

In accordance with another embodiment of the invention, there is provided a method, which includes receiving, using a transceiver, a session-mode message including an indication in a header of the session-mode message indicating that a session-mode is for a page-mode message, and, in response to said indication, treating, using the user terminal, the received session-mode message as the page-mode message. The method further includes notifying a user of the received page-mode message. The page-mode message is received as the session-mode message with the indication in response to a page-mode message exceeding a predetermined size limit.

In accordance with another embodiment of the invention, there is provided a computer program product embodied on a non-transitory computer readable storage medium. The computer program is encoded to control a processor to perform a process, which includes determining whether a page-mode message exceeds a predetermined size limit, and sending the page-mode message using a session-mode messaging mechanism, when it is determined that the page-mode message exceeds the predetermined size limit, with an indication indicating that a session-mode is for the page-mode message. The process further includes applying a session description protocol to initiate a session in the session-mode messaging mechanism, and adding the indication to a header of a session initiation message.

In accordance with another embodiment of the invention, there is provided a computer program product embodied on a non-transitory computer readable storage medium. The computer program is encoded to control a processor to perform a process, which includes receiving, using a transceiver, a session-mode message including an indication in a header of the session-mode message indicating that a session-mode is for a page-mode message. The process further includes, in response to said indication, treating, using the user terminal, the received session-mode message as the page-mode message, and notifying a user of the received page-mode message. The page-mode message is received as the session-mode message with the indication in response to the page-mode message exceeding a predetermined size limit.

In accordance with another embodiment of the invention, there is provided a method, which includes determining whether a page-mode message exceeds a predetermined size limit. The method further includes sending, using a terminal, the page-mode message using a session-mode messaging mechanism, when it is determined that the page-mode message exceeds the predetermined size limit, with an indication indicating that a session-mode is for the page-mode message. The indication includes at least one of an m-line indication. The method further includes applying, using the terminal, a session description protocol to initiate a session in the session-mode messaging mechanism, and adding, using the terminal, the indication to a header of a session initiation protocol message.

In accordance with another embodiment of the invention, there is provided an apparatus, which includes at least one processor, and memory including computer program code. The memory and the computer program code are configured to, with the at least one processor, cause the apparatus at least to determine whether a page-mode message exceeds a predetermined size limit. The memory and the computer program code are also configured to, with the at least one processor, cause the apparatus at least to send a message using a session-mode messaging mechanism, when it is determined that the page-mode message exceeds the predetermined size limit, with an indication indicating that the message is a page-mode message. The indication includes at least one of an m-line indication. The memory and the computer program code are also configured to, with the at least one processor, cause the apparatus at least to apply a session description protocol to initiate a session in the session-mode messaging mechanism, and add the indication to a header of a session initiation protocol message.

In accordance with another embodiment of the invention, there is provided an apparatus, which includes at least one processor, and memory including computer program code. The memory and the computer program code are configured to, with the at least one processor, cause the apparatus at least to detect an indication in a header of a session initiation protocol message that a session-mode messaging mechanism is used for a page-mode message, and, in response to the indication, treat a received session-mode message as the page-mode message. The memory and the computer program code are also configured to, with the at least one processor, cause the apparatus at least to notify a user of the received page-mode message, and at least one of store the received page-mode message and forward the received page-mode message to a terminal. The page-mode message is received as the session-mode message with the indication in response to a page-mode message exceeding a predetermined size limit.

In accordance with another embodiment of the invention, there is provided an apparatus, which includes at least one processor, and memory including computer program code. The memory and the computer program code are configured to, with the at least one processor, cause the apparatus at least to detect an indication in a header of a session initiation protocol message that a session-mode messaging mechanism is used for a page-mode message, and, in response to the indication, assume itself to be an end-point of the session-mode messaging mechanism. The memory and the computer program code are also configured to, with the at least one processor, cause the apparatus at least to, in response to the indication, define a message received via the session-mode messaging mechanism as the page-mode message, and check, in response to the indication, a size of the page-mode message, and to decide whether to continue or terminate the session-mode messaging mechanism based on the size of the page-mode message.

In accordance with another embodiment of the invention, there is provided an apparatus, which includes at least one processor, and memory including computer program code. The memory and the computer program code are configured to, with the at least one processor, cause the apparatus at least to detect an indication in a header of a session initiation protocol message that a session-mode messaging mechanism is used for a page-mode message, and, in response to the indication, treat a received session-mode message as the page-mode message. The memory and the computer program code are also configured to, with the at least one processor, cause the apparatus at least to check, in response to said indication, a size of the page-mode message, to request from a user further instructions relating to whether to continue or terminate the session-mode messaging mechanism.

In accordance with another embodiment of the invention, there is provided an apparatus, which includes at least one processor, and memory including computer program code. The memory and the computer program code are configured to, with the at least one processor, cause the apparatus at least to detect an indication in a header of a session initiation protocol message that a session-mode messaging mechanism is used for a page-mode message, wherein the indication includes at least one of an m-line indication, and, in response to the indication, treat a received session-mode message as the page-mode message. The memory and the computer program code are also configured to, with the at least one processor, cause the apparatus at least to notify a user of the received page-mode message, and at least one of store the received page-mode message and forward the received page-mode message to a terminal. the page-mode message is received as the session-mode message with the indication in response to the page-mode message exceeding a predetermined size limit.

In accordance with another embodiment of the invention, there is provided an apparatus, which includes at least one processor, and memory including computer program code. The memory and the computer program code are configured to, with the at least one processor, cause the apparatus at least to detect an indication in a header of a session initiation protocol message that a session-mode messaging mechanism is used for a page-mode message. The indication includes at least one an m-line indication. The memory and the computer program code are also configured to, with the at least one processor, cause the apparatus at least to in response to the indication, forward a received session-mode message as the page-mode message to a node to store the received page-mode message. The page-mode message is received as the session-mode message with the indication in response to a page-mode message exceeding a predetermined size limit.

An object of the present invention is to provide a method and an apparatus for implementing the method so as to overcome the above problem. The objects of the invention are achieved by a method, user terminals and a server, which are characterized by what is stated in the independent claims. Preferred embodiments of the invention are disclosed in the dependent claims.

The invention is based on realizing the problem and solving it by indicating whether or not a message sent using a session-mode (chat-type) messaging mechanism is a page-mode message, and in response to the message being a page-mode message, acting as if it had been received using a page-mode mechanism or according to specific instructions defined for such a page-mode message. By session-mode is meant that a protocol, such as MSRP, intended for exchanging series of messages is used. By page-mode is meant that each message is an independent transaction at a protocol level, i.e. a subsequent instant message is not related, at the protocol level, to the preceding one.

An advantage of the invention is that by using the indication, page-mode messages can be received as page-mode messages, even when transmitted as session-mode messages. Another advantage is that blocking of SIP signaling due to large messages can be avoided.

BRIEF DESCRIPTION OF THE DRAWINGS

In the following, the invention will be described in greater detail by means of the preferred embodiments with reference to the attached drawings, in which

FIGS. 5A to 5D illustrate examples of SIP INVITE messages according to embodiments of the invention.

DETAILED DESCRIPTION OF THE PREFERRED EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any user terminals, servers and/or to any communications system or any combination of different communications systems that is/are accessible by user terminals and provide(s) messaging services, i.e. sending data in a message format from one entity to another either in near real time or into a mailbox. No limitations exist to the message format, neither to the data type. The data may be text, voice, video clips, multimedia, etc. The communications system may be a fixed communications system or a wireless communications system or a communications system utilizing both fixed networks and wireless networks. The protocols used, the specifications of communications systems and terminals, especially in wireless communications, develop rapidly. Such development may require extra changes to the invention. Therefore, all words and expressions should be interpreted broadly and they are intended to illustrate, not to restrict, the invention.

In the following, the present invention will be described using, as an example of a system environment whereto the present invention may be applied, a very simplified system environment utilizing SIP and MSRP, without restricting the invention thereto. It should be appreciated that the communications system and the intermediate nodes, such as proxies, and other protocols used below or above SIP and MSRP, or corresponding protocols, are irrelevant to the actual invention. Therefore, they need not to be discussed in more detail here. The present invention primarily relates to a message transmission in an application layer.

Figure 1:
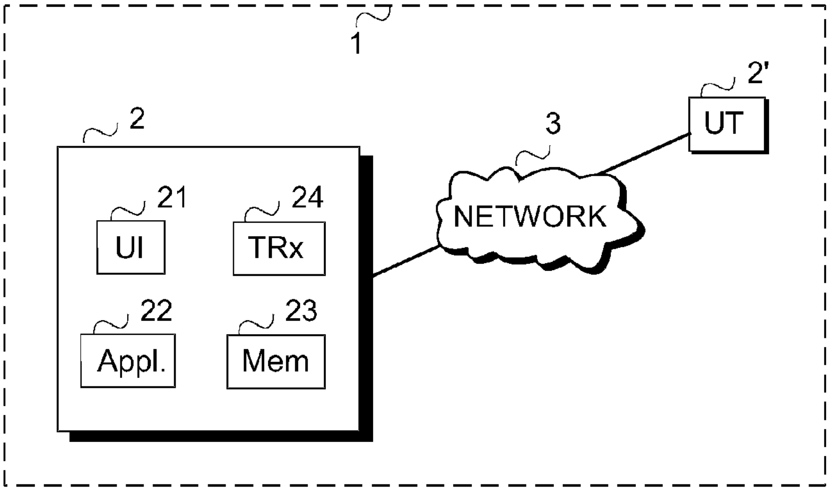
FIG. 1 shows a simplified system architecture.

FIG. 1 is a highly simplified system architecture only showing a communications system 1, two user terminals UT 2, 2' and a network 3. It is apparent to a person skilled in the art that the system(s) also includes other devices, system entities, such as instant messaging servers, functions and structures that need not be described in detail herein.

A user terminal 2, 2' is a piece of equipment or a device that allows a user to interact with a communications system directly or via a computer system, that is, it presents information to the user and allows the user to input information, i.e. the user terminal is a termination point of particular communication. In other words, the user terminal 2, 2' may be any node or a host which supports messaging and is able to communicate with a network of the system, over an access network (not shown in FIG. 1) if such an access network exists. The user terminal 2, 2' may be a non-mobile apparatus, such as a personal computer PC, connected to the network 3 wirelessly or via a fixed connection. The user terminal 2, 2' may also be a wireless mobile terminal supporting messaging, a multi-service terminal that serves as a service platform and supports loading and execution of different service-related functions, or a laptop PC, connectable to the network (via a possible access network), a personal digital assistant PDA, connectable to the network (via the possible access network), etc.

The user terminal 2 includes at least one user interface (UI) 21 via which the user can create and/or read messages, one or more messaging applications (Appl.) 22, memory (Mem) 23 (or the user terminal is arranged to have access to memory) for storing received page-mode type messages at least temporarily, and a transceiver (TRx) 24 for sending and receiving communications (messages).

The messaging application 22 may be a software application configured to implement a functionality according to the invention. The functionality may be achieved by updating a corresponding messaging application or by adding a new messaging application to the terminal, for example.

Figure 2:
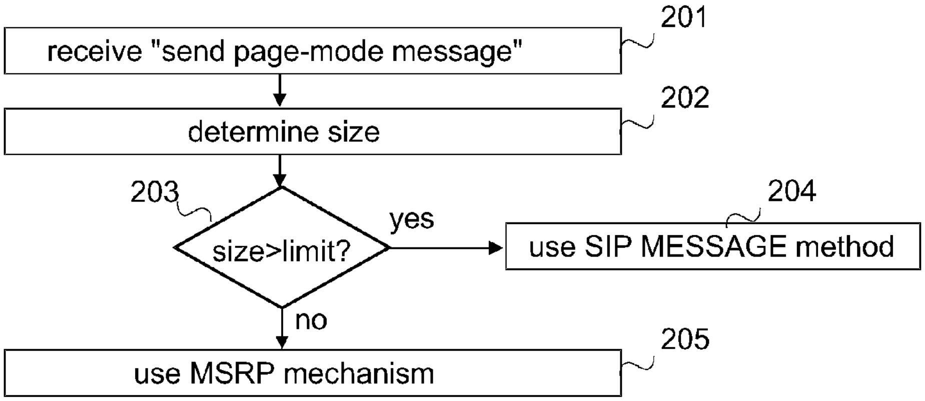
FIG. 2 is a flow chart illustrating a functionality of a user terminal according to an embodiment of the invention in a sending mode.

FIG. 2 is a flow chart illustrating a functionality of a user terminal according to an embodiment of the invention in a sending mode. In the example of FIG. 2 it is assumed that the user always creates page-mode messages in a similar way and that the user terminal selects the method/mechanism to be used with the message.

FIG. 2 starts when the user has created a page-mode message and gives, via a user interface, instructions to send the message to a receiver (step 201). In other words, the user terminal receives, in step 201, a "send message to this address" command. In response to the command, the user terminal determines, in step 202, the size of the message and checks, in step 203, whether or not the message size is larger than a predetermined limit for the size. The predetermined limit may be defined by a service protocol used, by the user or by the operator or it may be preconfigured to the terminal, for example. Preferably, the predetermined limit corresponds to a size which fits into a transport protocol message. However, the value of the predetermined limit and the way in which the predetermined limit is set bears no significance for the present invention. In some embodiments of the invention, it is even possible that all page-mode messages, regardless of their size, are sent using the MSRP mechanism or a corresponding mechanism. For example, the user terminal may be pre-configured to always use session-mode because the operator does not allow page-mode to be used.

If the message size does not exceed than the limit (step 203), the user terminal sends, in step 204, the contents using the SIP MESSAGE method.

If the message size does exceed the limit (step 203), the user terminal sends, in step 205, the message using the MSRP mechanism, according to the invention, with a page mode indicator. Depending on the implementation, the user terminal may or may not add information to the page-mode message sent by MSRP on the actual size of the message. The actual message sending procedure is illustrated in more detail in FIGS. 6, 7 and 8.

In one embodiment of the invention, the user has to select from among three options: small page-mode message (size is smaller than or equal to a predetermined limit), other page-mode messages, session (chat) messaging, and when the user selects other page-mode messages, the session-mode messaging mechanism with a page-mode indicator is used when the message is sent.

Figure 3:
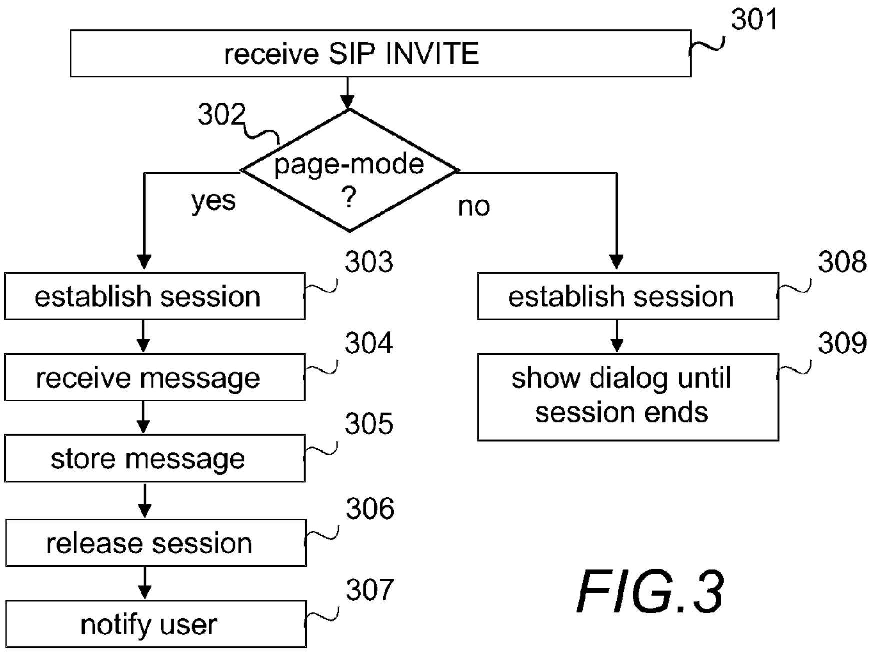
FIGS. 3 and 4 are flow charts illustrating a functionality of a user terminal according to embodiments of the invention in a receiving mode.

FIG. 3 is a flow chart illustrating a functionality of a user terminal according to an embodiment of the invention in a receiving mode. In the example of FIG. 3, it is assumed that no information on the actual size of the message is transmitted. Further assumptions made for the sake of clarity are, that the user terminal has enough free memory for messages so that the message may be received, and that the user terminal is configured to accept page-mode messages. What happens if the message is larger than the free memory is irrelevant for the invention; this depends on the receiving terminal's implementation; a terminal may reject the session request if not enough free memory exists, or a session request is accepted but the session is terminated when the memory is full, for example.

In response to receiving a SIP INVITE (MSRP) (step 301), the user terminal checks, in step 302, whether or not the SIP INVITE (MSRP) is for a page-mode message. If yes, the user terminal establishes, in step 303, a session; receives, in step 304, the message; and stores, in step 305, the message; and releases, in step 306, the session. Subsequently, or simultaneously, the user terminal indicates, in step 307, to the user that a message has been received. The user may then read the message later. In other words, the user terminal acts towards the user as if the message were received over a SIP MESSAGE method.

If the SIP INVITE (MSRP) is for chat (i.e. for session-mode messaging), not for a page-mode message (step 302), the user terminal establishes, in step 308, a session and shows, in step 309, the dialog until the session ends.

The receiving user terminal may be configured to reject all page-mode messages, in which case no session is established but, instead of steps 303 to 307, a rejection is sent.

Figure 7:
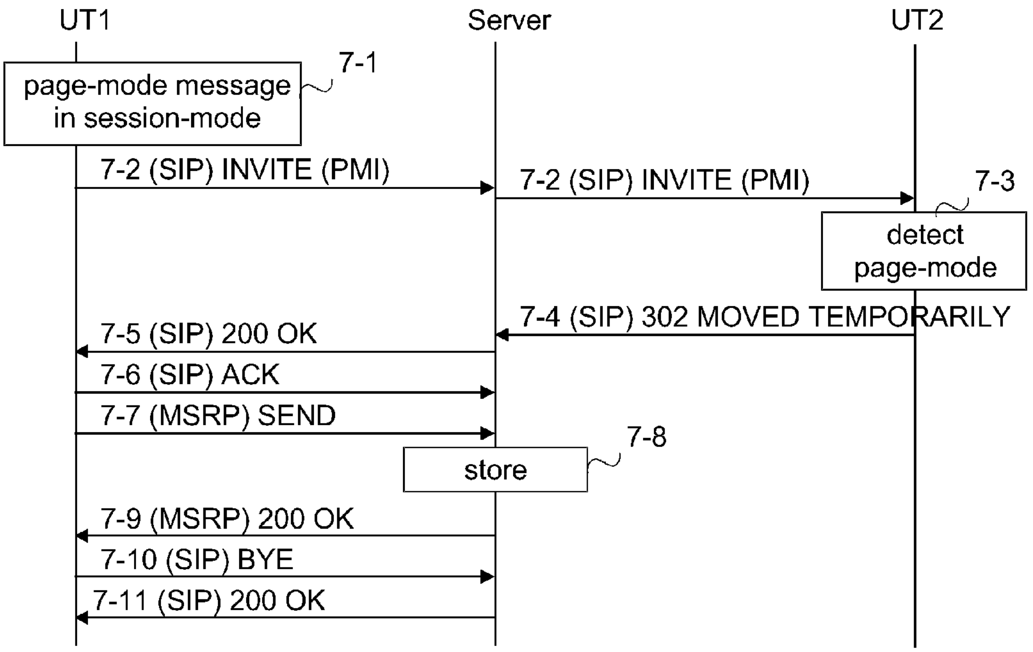
Figure 8:
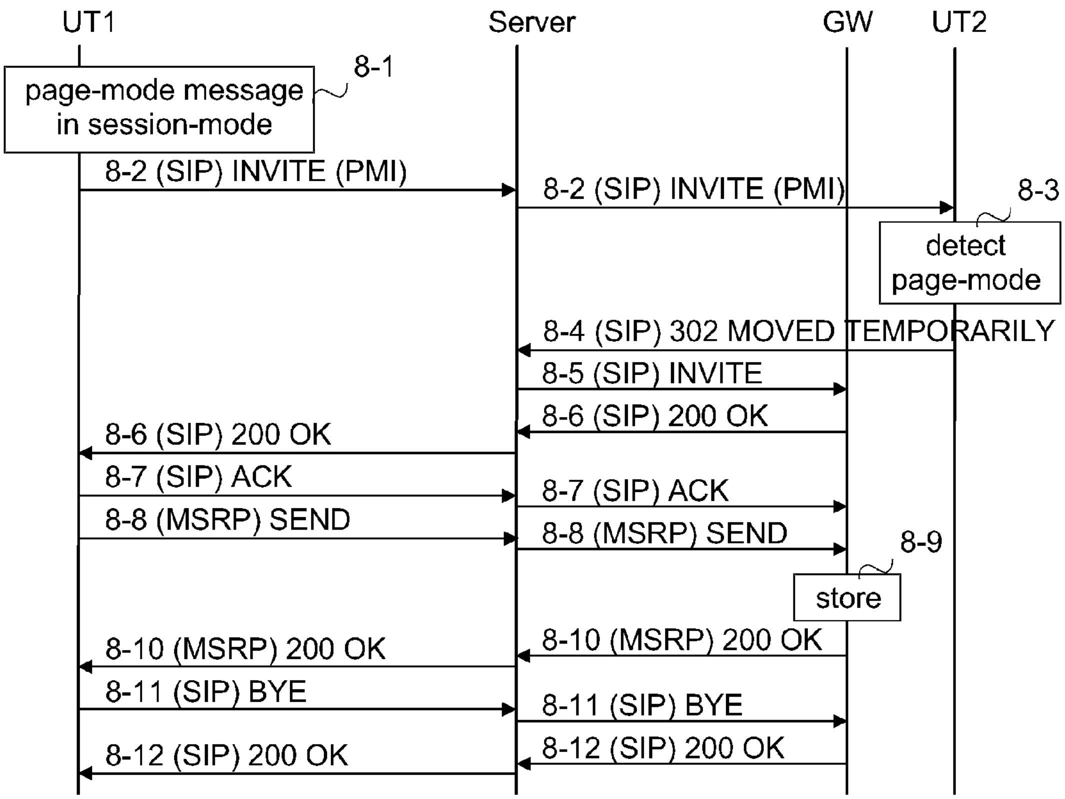

The receiving user terminal may be configured to forward page-mode message requests to a network inbox, to another terminal, etc., in which case no session is established but, instead of steps 303 to 307, the request is forwarded. Examples of such situations are illustrated in FIGS. 7 and 8. Even if all page-mode messages are forwarded to be stored elsewhere, and the user needs to view them by another terminal, the forwarding terminal is considered to provide the page-mode messaging.

In another embodiment of the invention, the checking is performed after the message is received (i.e. step 302 is performed after step 304, and the process continues after the checking either in step 305 or in step 308).

Figure 4:
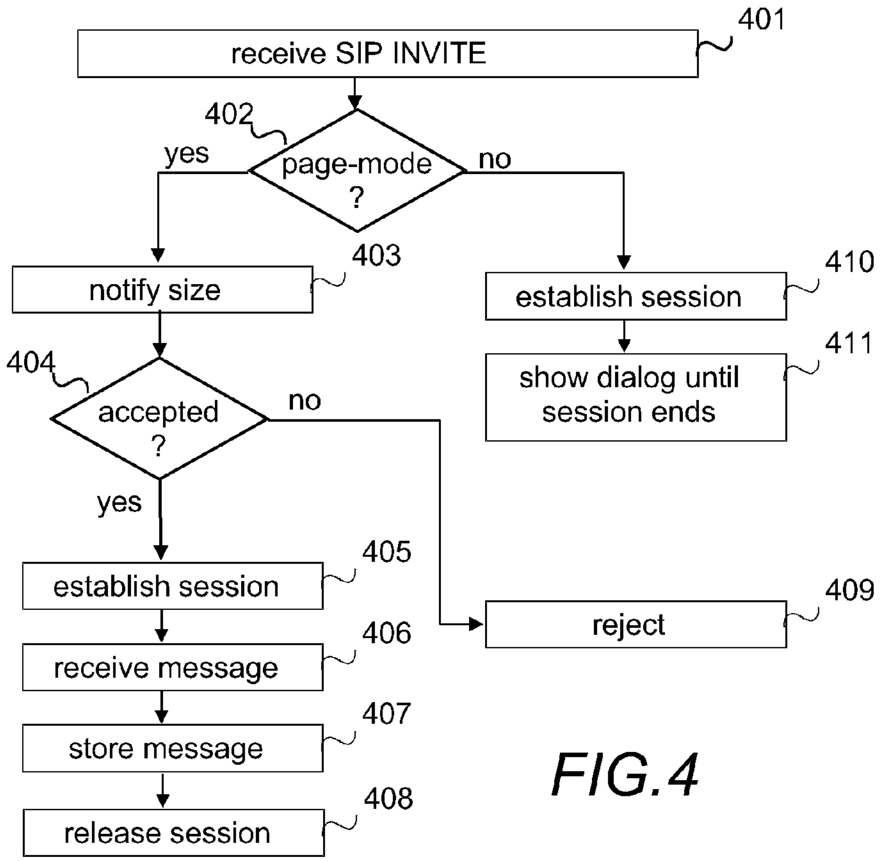

FIG. 4 is a flow chart illustrating a functionality of a user terminal according to another embodiment of the invention in a receiving mode. In the example of FIG. 4, it is assumed that information exists on the actual size of the message. Further assumptions made for the sake of clarity are, as above in connection with FIG. 3, with the same explanations not unnecessarily repeated here, that the user terminal has enough free memory for messages and that the user terminal is configured to accept page-mode messages.

In response to receiving SIP INVITE (MSRP) (step 401), the user terminal checks, in step 402, whether or not the SIP INVITE (MSRP) is for a page-mode message. If yes, the user terminal notifies, in step 403, the user about the size of the message. If the user accepts the message (step 404), the user terminal establishes, in step 405, a session; receives, in step 406, the message; and stores, in step 407, the message. The user may then read the message later. Next the user terminal releases, in step 408, the session. In other words, the user terminal acts towards the user as if the message were received over a SIP MESSAGE method. In this specific example, the user terminal does not notify the user about the reception of the message because it is assumed that by accepting the message delivery the user was already notified about the message. However, in another implementation, the user device may be configured to also notify the reception of the message to the user.

If the user does not accept the message (step 404), the user terminal rejects, in step 409, session establishment. In another embodiment, the user terminal, instead of rejecting, may forward session establishment so that the message is stored in the network and can be retrieved later, as illustrated in FIGS. 7 and 8.

If the SIP INVITE (MSRP) is for chat (i.e. for session-mode messaging), not for a page-mode message (step 402), the user terminal establishes, in step 410, a session and shows, in step 411, the dialog until the session ends.

In another embodiment of the invention, instead of asking whether or not the user accepts the message, (i.e. instead of step 403), the user terminal is configured to accept a message which does not exceed a predefined size limit. The predefined size limit may be defined by an operator, by a user terminal manufacturer and/or by a user, for example.

In the following, the signaling will be described in more detail with some examples illustrated in FIGS. 5A to 8, using SDP (Session Description Protocol) to initiate a session and MSRP over TCP to transmit the actual contents without limiting the invention to such examples. Another assumption made in connection with the following examples is that the receiving user terminal will not reject the message. If required, further information can be found at http://www.ietf.org/internet-drafts/draft-ietf-simple-message-sessions-10.txt, which is incorporated herein as a reference. However, it bears no significance for the invention which protocols are used, the above ones only being examples. For example, instead of SDP, other offer-answer mechanism protocols may be used and, instead of TCP, other congestion-controlled protocols, such as SCTP (Signaling Common Transport Protocol), may be used.

FIGS. 5A to 5D illustrate some examples of how a session-mode message may indicate that a session-mode invitation is for a page-mode message.

In the embodiment of FIG. 5A, a page-mode message is indicated by a combination of an m-line containing a new page mode indicator 5-1 (m=message 9 msrp page-mode) and a parameter a=max-size indicating the actual size of the message 5-2 (a=max-size: actual size).

In the embodiment of FIG. 5B, a page-mode message is indicated by a combination of the m-line containing the new page mode indicator 5-1 (m=message 9 msrp page-mode) and a parameter 5-3 a=actual-size indicating the actual size of the message (a=actual-size: actual size). In this embodiment, the parameter a=max-size indicates the maximum size of a message.

In the embodiment of FIG. 5C, a page-mode message is indicated by the parameter 5-3 a=actual-size. When the value of the parameter differs from 0, it implicitly indicates that the message is a page-mode message, or vice versa. In this embodiment, the m-line information indicates that MSRP is to be used and the parameter a=max-size indicates the maximum size of a message.

In the embodiment of FIG. 5D, a page-mode message is indicated by the m-line containing a new page mode indicator 5-1 (m=message 9 msrp page-mode). In this embodiment, the parameter a=max-size indicates the maximum size of a message and no additional a-parameter is required.

Figure 6:
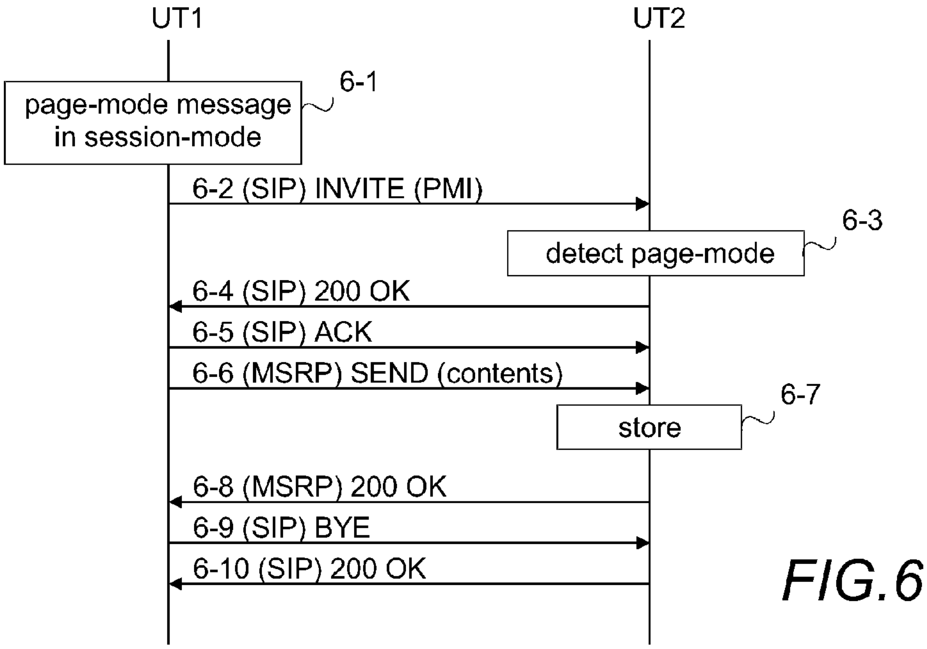
FIGS. 6, 7, 8 and 9 illustrate signaling according to embodiments of the invention.

In the signaling chart of FIG. 6, only signaling between endpoints is shown although one or more intermediaries may be involved. FIG. 6 illustrates signaling when a receiver, or more precisely, a corresponding client in the receiver's user terminal, accepts the message. FIG. 6 starts when Alice wants to send a message to Bob. Alice's user terminal UT1 (more precisely, a corresponding client in UT1) notices, in point 6-1, that the page-mode message has to be sent using a session-mode mechanism. (Point 6-1 is described in detail above in FIG. 2). Therefore, UT1 sends a session invitation message 6-2 with a page-mode indication PMI to Bob's user terminal UT2. Message 6-2 is preferably one of the messages illustrated in FIGS. 5A to 5D. In response to receiving message 6-2, UT2 detects, in point 6-3, that the message is a session-mode invitation for a page-mode message, and accepts the invitation by sending message 6-4. UT1 acknowledges the acceptance by sending message 6-5, and UT1 then sends the actual contents of the page-mode message in a session-mode message 6-6. In response to receiving the contents, UT2 stores, in point 6-7, the contents so that Bob can view them later. UT2 may also notify Bob, as described above in FIGS. 3 and 4. In response to receiving the contents, UT2 also acknowledges the reception by sending a session-mode acknowledgement in message 6-8. In the embodiment illustrated in FIG. 6, the sending user terminal, UT1, is configured to terminate the session in response to the acknowledgement by sending message 6-9 to UT2, which then sends message 6-10 to acknowledge the termination.

In the signaling chart of FIG. 7, signaling between endpoints via a participating instant messaging server of the receiving endpoint is shown although one or more intermediaries may be involved. FIG. 7 illustrates signaling when a receiver, or more precisely, a corresponding client in the receiver's user terminal, does not accept the message but requests the network to save the message for later retrieval. FIG. 7 starts when Alice wants to send a message to Bob. Alice's user terminal UT1 (more precisely, a corresponding client in UT1) notices, in point 7-1, that the page-mode message has to be sent using a session-mode mechanism. (Point 7-1 is described in detail above in connection with FIG. 2). Therefore, UT1 sends a session invitation message 7-2 with a page-mode indication PMI to Bob's user terminal UT2 via the server. Message 7-2 is preferably one of the messages illustrated in FIGS. 5A to 5D. In response to receiving message 7-2, UT2 detects, in point 7-3, that the message is a session-mode invitation for a page-mode message. For some reason, UT2 does not accept the page mode message but sends a redirecting message 7-4 to the server. One example of redirecting messages is a SIP 302 "Moved Temporarily" message which may contain information on how a message should be treated. However, it is irrelevant to the invention how and with which protocols redirection is performed and additional instructions/information is/are given, if necessary. Other examples include utilizing separate transactions using SIP protocols, such as SIP PUBLISH, SIP OPTIONS, called capabilities in SIP REGISTER, or with XCAP (eXtensible markup language Configuration Access Protocol). UT2 may also notify Bob about the message, as described above in connection with FIGS. 3 and 4.

In this example, the server, and more precisely, a back-to-back-user-agent, accepts to offer an alternative service, and therefore the server assumes itself to be the session end-point and accepts the initial invitation by sending message 7-5. UT1 acknowledges the acceptance by sending message 7-6 to the server and then sends the actual contents of the page-mode message in a session-mode message 7-7 to the server. In response to receiving the contents, the server stores, in point 7-8, the contents so that Bob can view them later. In response to receiving the contents, the server also acknowledges the reception by sending a session-mode acknowledgement in message 7-9. In the embodiment illustrated in FIG. 7, the sending user terminal, UT1, is configured to terminate the session in response to the acknowledgement by sending message 7-10 to the server, which then sends message 7-11 to acknowledge the termination. Bob may then view the message contents later, but the implementation of this viewing is irrelevant for the invention, and is therefore not discussed here in detail.

In the signaling chart of FIG. 8, as in FIG. 7, signaling between endpoints via a participating instant messaging server of the receiving endpoint is shown although one or more intermediaries may be involved. FIG. 8 illustrates signaling when a receiver, or more precisely, a corresponding client in the receiver's user terminal, does not accept the message but requests a gateway GW in the network to save the message for later retrieval. FIG. 8 starts when Alice wants to send a message to Bob. Alice's user terminal UT1 (more precisely, a corresponding client in UT1) notices, in point 8-1, that the page-mode message has to be sent using a session-mode mechanism. (Point 8-1 is described in detail above in connection with FIG. 2). Therefore UT1 sends a session invitation message 8-2 with a page-mode indication PMI to Bob's user terminal UT2 via the server. Message 8-2 is preferably one of the messages illustrated in FIGS. 5A to 5D. In response to receiving message 8-2, UT2 detects, in point 8-3, that the message is a session-mode invitation for a page-mode message. For some reason, UT2 does not accept the page mode message but sends a redirecting message 8-4 to the server, the redirecting message indicating that the message should be forwarded to the gateway GW. (Redirecting messages were discussed above in connection with FIG. 7.) UT2 may also notify Bob about the message, as described above in connection with FIGS. 3 and 4.

In this example, the server, and more precisely, a back-to-back-user-agent, generates a new request to the URI (uniform resource identifier) of GW indicated in message 8-4 and sends the request in message 8-5. The request is preferably a session-mode invitation without a page-mode indication. GW accepts the initial invitation by sending message 8-6. UT1 acknowledges the acceptance by sending message 8-7 to GW and then sends the actual contents of the page-mode message in a session-mode message 8-8 to the GW. In response to receiving the contents, GW stores, in point 8-9, the contents so that Bob can view them later. In response to receiving the contents, GW also acknowledges the reception by sending a session-mode acknowledgement in message 8-10. In the embodiment illustrated in connection with FIG. 8, the sending user terminal, UT1, is configured to terminate the session in response to the acknowledgement by sending message 8-11 to GW, which then sends message 8-12 to acknowledge the termination. Bob may then view the message contents later, but the implementation of this viewing is irrelevant to the invention, and is therefore not discussed here in detail.

Figure 9:
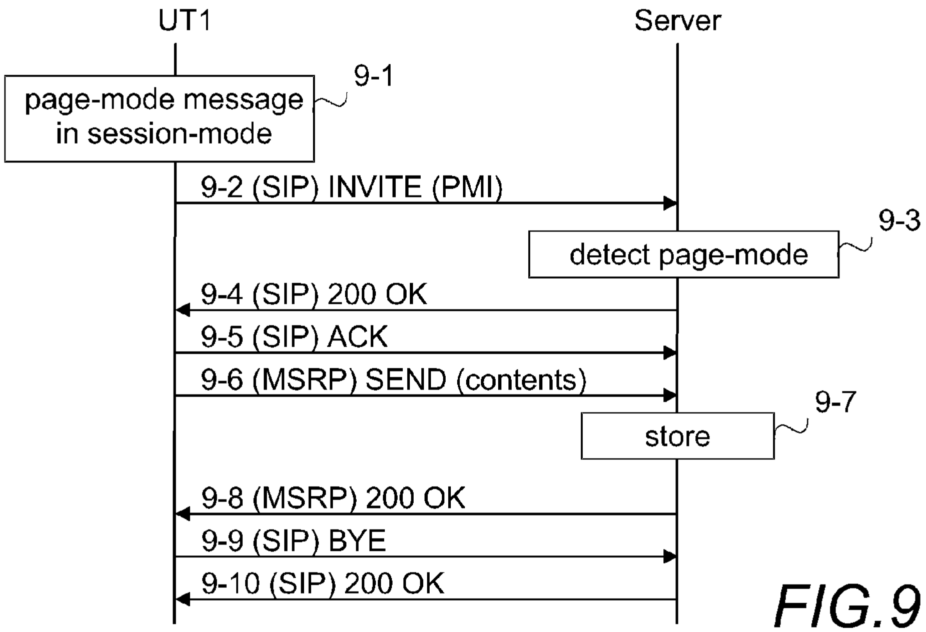

FIG. 9 illustrates signaling according to a further embodiment of the invention, in which embodiment an instant messaging server is also configured to detect the indication. The instant messaging server may be a separate server or a server component in a network node including one or more other components. In the example illustrated in FIG. 9, it is assumed that the recipient (UT2) is not reachable or has a configuration according to which recipient's page-mode messages are to be stored in the recipient's network inbox, in this example being located in the server. This may also be a network configuration. In the signaling chart of FIG. 9, signaling between a sending endpoint UT1 and a participating instant messaging server of the receiving endpoint is shown although one or more intermediaries may be involved. FIG. 9 starts when Alice wants to send a message to Bob. Alice's user terminal UT1 (more precisely, a corresponding client in UT1) notices, in point 9-1, that the page-mode message has to be sent using a session-mode mechanism. (Point 9-1 is described in detail above in connection with FIG. 2). Therefore, UT1 sends a session invitation message 9-2 with a page-mode indication PMI to Bob's user terminal UT2 via the server. Message 9-2 is preferably one of the messages illustrated in FIGS. 5A to 5D. In response to receiving message 9-2, the server, and more precisely, a back-to-back-user-agent, detects, in point 9-3, that the message is a session-mode invitation for a page-mode message, and therefore checks Bob's, i.e. UT2's, configurations for page-mode messages. Since the configurations show that page-mode messages are to be stored for later retrieval, the server assumes itself to be the session end-point and accepts the invitation by sending message 9-4. UT1 acknowledges the acceptance by sending message 9-5 to the server and then sends the actual contents of the page-mode message in a session-mode message 9-6 to the server. In response to receiving the contents, the server stores, in point 9-7, the contents so that Bob can view them later. In some other embodiment of the invention, the message may be stored in another network node or a remote database or forwarded to a gateway. In response to receiving the contents, the server also acknowledges the reception by sending a session-mode acknowledgement in message 9-8. In the embodiment illustrated in connection with FIG. 9, the sending user terminal, UT1, is configured to terminate the session in response to the acknowledgement by sending message 9-9 to the server, which then sends message 9-10 to acknowledge the termination. Bob may then view the message contents later, but the implementation of this viewing is irrelevant for the invention and is therefore not discussed here in detail.

In another embodiment of the invention, the receiver's instant messaging server is arranged to decide whether or not to forward the session request or to assume itself to be an ending point on the basis of the message size, receiver's terminal capabilities and/or network load.

In a further embodiment based on FIG. 9, the user may have a configuration according to which page-mode messages transmitted using a session-mode mechanism are stored in the network inbox and only notified to the user, whereas page-mode messages transmitted using a page-mode mechanism are forwarded to the user.

The steps, points and signaling messages shown in FIGS. 2, 3, 4, 6, 7, 8 and 9 are in no absolute chronological order and some of the steps/points may be performed simultaneously or in an order different from the given one. Other functions can also be executed between the steps/points or within the steps/points. Some of the steps/points or part of the steps/points can also be left out. The signaling messages are only exemplary and may even include several separate messages for transmitting the same information. In addition, the messages may also contain other information. The messages and steps/points can also be freely combined or divided into several parts. Furthermore, the names, types and/or contents of the messages may differ from the above-mentioned ones, as well as the protocols used.

Although in the above the invention has been disclosed assuming that the communication, i.e. file transmission and calls, is one-to-one communication, it is obvious to one skilled in the art that the communication may as well be one-to-many communication.

The embodiments presented above or parts thereof can be combined to produce preferred embodiments of the invention.

The user terminals, other corresponding devices and/or servers or corresponding server components implementing the functionality of the present invention include not only prior art means but also means for sending and/or receiving page-mode messages in the manner described above. Present network nodes and user terminals include processors and memory that can be utilized in the functions according to the invention. All modifications and configurations required for implementing the invention may be performed as routines, which may be implemented as added or updated software routines, application circuits (ASIC) and/or programmable circuits.

It will be obvious to a person skilled in the art that as technology advances, the inventive concept can be implemented in various ways. The invention and its embodiments are not limited to the examples described above but may vary within the scope of the claims.

We claim:

1. A method, comprising:

determining whether a page-mode message exceeds a predetermined size limit;

sending, using a terminal, the page-mode message using a session-mode messaging mechanism when it is determined that the page-mode message exceeds the predetermined size limit, with an indication indicating that a session-mode is for the page-mode message;

applying, using the terminal, a session description protocol to initiate a session in the session-mode messaging mechanism; and adding, using the terminal, the indication to a header of a session initiation message.

2. The method of claim 1, further comprising:

creating, using the terminal, the session for sending the page-mode message; and terminating, using the terminal, the session in response to the page-mode message having been sent.

3. The method of claim 1, further comprising:

creating, using the terminal, the session for sending the page-mode message;

receiving, using the terminal, information that the page-mode message has been received; and terminating, using the terminal, the session in response to the page-mode message having been received.

4. The method of claim 1, wherein the adding comprises adding the indication in an m-line in the header.

5. The method of claim 1, wherein the adding comprises adding the indication comprising a parameter indicating an actual size of the page-mode message.

6. The method of claim 1, wherein the adding comprises adding the indication comprising at least one of an m-line indication and a parameter indicating an actual size of the page-mode message.

7. An apparatus, comprising:

at least one processor; and memory including computer program code, the memory and the computer program code configured to, with the at least one processor, cause the apparatus at least to determine whether a page-mode message exceeds a predetermined size limit, send a message using a session-mode messaging mechanism, when it is determined that the page-mode message exceeds the predetermined size limit, with an indication indicating that the message is a page-mode message, apply a session description protocol to initiate a session in the session-mode messaging mechanism, and add the indication to a header of a session initiation message.

8. The apparatus of claim 7, wherein the memory and the computer program code are further configured to, with the at least one processor, cause the apparatus at least to send the page-mode message in response to a user command.

9. An apparatus, comprising:

at least one processor; and memory including computer program code, the memory and the computer program code configured to, with the at least one processor, cause the apparatus at least to detect an indication in a header of a session initiation message that a session-mode messaging mechanism is used for a page-mode message, and in response to the indication, treat a received session-mode message as the page-mode message, and notify a user of the received page-mode message, wherein the page-mode message is received as the session-mode message with the indication in response to the page-mode message exceeding a predetermined size limit.

10. The apparatus of claim 9, wherein the memory and the computer program code are further configured to, with the at least one processor, cause the apparatus at least to store the received page-mode message in response to the reception.

11. The apparatus of claim 9, wherein the memory and the computer program code are further configured to, with the at least one processor, cause the apparatus at least to forward the received page-mode message to a terminal.

12. The apparatus of claim 9, wherein the memory and the computer program code are further configured to, with the at least one processor, cause the apparatus at least to check, in response to said indication, a size of the page-mode message, and to decide whether to continue or terminate the session-mode messaging mechanism based on the size of the page-mode message.

13. The apparatus of claim 9, wherein the memory and the computer program code are further configured to, with the at least one processor, cause the apparatus at least to check, in response to said indication, a size of the page-mode message, to request from a user further instructions relating to whether to continue or terminate the session-mode messaging mechanism, and to display the size of the page-mode message to the user.

14. The apparatus of claim 9, wherein the memory and the computer program code are further configured to, with the at least one processor, cause the apparatus at least to forward a session request relating to the received page-mode message to continue the session-mode messaging mechanism.

15. A server apparatus, comprising:

at least one processor; and memory including computer program code, the memory and the computer program code configured to, with the at least one processor, cause the server apparatus at least to detect an indication in a header of a session initiation message that a session-mode messaging mechanism is used for a page-mode message, in response to the indication, assume itself to be an endpoint of the session-mode messaging mechanism, in response to the indication, define a message received via the session-mode messaging mechanism as the page-mode message, and notify a user of the received page-mode message, wherein the page-mode message is received as the session-mode message with the indication in response to a page-mode message exceeding a predetermined size limit.

16. A method comprising:

receiving, using a transceiver, a session-mode message comprising an indication in a header of the session-mode message indicating that a session-mode is for a page-mode message; and in response to said indication, treating, using the user terminal, the received session-mode message as the page-mode message, and notifying a user of the received page-mode message, wherein the page-mode message is received as the session-mode message with the indication in response to a page-mode message exceeding a predetermined size limit.

17. The method of claim 16, wherein the receiving comprises receiving the session-mode message with the indication comprising at least one of an m-line indication and a parameter indicating an actual size of the page-mode message.

18. The method of claim 16, further comprising:

storing the received page-mode message in response to the reception.

19. The method of claim 16, further comprising:

checking, in response to the indication, a size of the page-mode message; and deciding whether to continue or terminate the session-mode messaging mechanism based on the size of the page-mode message.

20. The method of claim 16, further comprising:

checking, in response to said indication, a size of the page-mode message, to request from the user further instructions relating to whether to continue or terminate the session-mode messaging mechanism; and displaying the size of the page-mode message to the user.

21. The method of claim 15, further comprising:

forwarding a session request relating to the page-mode message to continue the session-mode messaging mechanism.

22. A non-transitory computer readable medium embodied on a computer program product, the computer program product being encoded to control a processor to perform a process, the process comprising:

determining whether a page-mode message exceeds a predetermined size limit;

sending the page-mode message using a session-mode messaging mechanism, when it is determined that the page-mode message exceeds the predetermined size limit, with an indication indicating that a session-mode is for the page-mode message;

applying a session description protocol to initiate a session in the session-mode messaging mechanism; and adding the indication to a header of a session initiation message.

23. A non-transitory computer readable medium embodied on a computer program product, the computer program product being encoded to control a processor to perform a process, the process comprising:

receiving, using a transceiver, a session-mode message comprising an indication in a header of the session-mode message indicating that a session-mode is for a page-mode message, in response to said indication, treating, using the user terminal, the received session-mode message as the page-mode message, and notifying a user of the received page-mode message, wherein the page-mode message is received as the session-mode message with the indication in response to the page-mode message exceeding a predetermined size limit.

24. A method, comprising:

determining whether a page-mode message exceeds a predetermined size limit;

sending, using a terminal, the page-mode message using a session-mode messaging mechanism, when it is determined that the page-mode message exceeds the predetermined size limit, with an indication indicating that a session-mode is for the page-mode message, wherein the indication comprises at least one of an m-line indication;

applying, using the terminal, a session description protocol to initiate a session in the session-mode messaging mechanism; and adding, using the terminal, the indication to a header of a session initiation protocol message.

25. The method of claim 24, further comprising:

creating, using the terminal, the session for sending the page-mode message; and terminating, using the terminal, the session in response to the page-mode message having been sent.

26. The method of claim 24, further comprising:

creating, using the terminal, the session for sending the page-mode message;

receiving, using the terminal, information that the page-mode message has been received; and terminating, using the terminal, the session in response to the page-mode message having been received.

27. An apparatus, comprising:

at least one processor; and memory including computer program code, the memory and the computer program code configured to, with the at least one processor, cause the apparatus at least to determine whether a page-mode message exceeds a predetermined size limit, send a message using a session-mode messaging mechanism, when it is determined that the page-mode message exceeds the predetermined size limit, with an indication indicating that the message is a page-mode message, wherein the indication comprises at least one of an m-line indication, apply a session description protocol to initiate a session in the session-mode messaging mechanism, and add the indication to a header of a session initiation protocol message.

28. The apparatus of claim 27, wherein the memory and the computer program code are further configured to, with the at least one processor, cause the apparatus at least to send the page-mode message in response to a user command.

29. The apparatus of claim 27, wherein the memory and the computer program code are further configured to, with the at least one processor, cause the apparatus at least to terminate the session when the page-mode message is sent.

30. The apparatus of claim 27, wherein the memory and the computer program code are further configured to, with the at least one processor, cause the apparatus at least to receive information that the page-mode message has been received, and to terminate the session in response to the page-mode message having been received.

31. An apparatus, comprising:

at least one processor; and memory including computer program code, the memory and the computer program code configured to, with the at least one processor, cause the apparatus at least to detect an indication in a header of a session initiation protocol message that a session-mode messaging mechanism is used for a page-mode message, in response to the indication, treat a received session-mode message as the page-mode message, notify a user of the received page-mode message, and at least one of store the received page-mode message and forward the received page-mode message to a terminal, wherein the page-mode message is received as the session-mode message with the indication in response to a page-mode message exceeding a predetermined size limit.

32. An apparatus, comprising:

at least one processor; and memory including computer program code, the memory and the computer program code configured to, with the at least one processor, cause the server apparatus at least to detect an indication in a header of a session initiation protocol message that a session-mode messaging mechanism is used for a page-mode message, in response to the indication, assume itself to be an end-point of the session-mode messaging mechanism, in response to the indication, define a message received via the session-mode messaging mechanism as the page-mode message, and check, in response to the indication, a size of the page-mode message, and to decide whether to continue or terminate the session-mode messaging mechanism based on the size of the page-mode message.

33. An apparatus, comprising:

at least one processor; and memory including computer program code, the memory and the computer program code configured to, with the at least one processor, cause the apparatus at least to detect an indication in a header of a session initiation protocol message that a session-mode messaging mechanism is used for a page-mode message, in response to the indication, treat a received session-mode message as the page-mode message, and check, in response to said indication, a size of the page-mode message, to request from a user further instructions relating to whether to continue or terminate the session-mode messaging mechanism.

34. An apparatus of claim 33, wherein the memory and the computer program code are further configured to, with the at least one processor, cause the apparatus at least to forward a session request relating to the page-mode message to continue the session-mode messaging mechanism.

35. An apparatus, comprising:

at least one processor; and memory including computer program code, the memory and the computer program code configured to, with the at least one processor, cause the apparatus at least to detect an indication in a header of a session initiation protocol message that a session-mode messaging mechanism is used for a page-mode message, wherein the indication comprises at least one of an m-line indication, in response to the indication, treat a received session-mode message as the page-mode message, notify a user of the received page-mode message, and at least one of store the received page-mode message and forward the received page-mode message to a terminal;

wherein the page-mode message is received as the session-mode message with the indication in response to the page-mode message exceeding a predetermined size limit.

36. An apparatus, comprising:

at least one processor; and memory including computer program code, the memory and the computer program code configured to, with the at least one processor, cause the apparatus at least to detect an indication in a header of a session initiation protocol message that a session-mode messaging mechanism is used for a page-mode message, wherein the indication comprises at least one an m-line indication, and in response to the indication, forward a received session-mode message as the page-mode message to a node to store the received page-mode message, wherein the page-mode message is received as the session-mode message with the indication in response to a page-mode message exceeding a predetermined size limit.

37. The apparatus of claim 36, wherein the memory and the computer program code are further configured to, with the at least one processor, cause the apparatus at least to send a session-mode message without an indication to notify the node of the forwarding of the received page-mode message.

38. The apparatus of claim 36, wherein the memory and the computer program code are further configured to, with the at least one processor, cause the apparatus at least to forward the received session-mode message as the page-mode message to the node, wherein the node comprises one of a network server and a gateway.

* * * * *